(12) United States Patent
Bunke et al.

(10) Patent No.: US 6,783,791 B2
(45) Date of Patent: Aug. 31, 2004

(54) COFFEE COMPOSITIONS COMPRISING PROCESSED COFFEE GROUNDS

(75) Inventors: Paul Ralph Bunke, Cincinnati, OH (US); Athula Ekanayake, Cincinnati, OH (US)

(73) Assignee: The Procter & Gamble Co., Cincinnati, OH (US)

( * ) Notice: Subject to any disclaimer, the term of this patent is extended or adjusted under 35 U.S.C. 154(b) by 367 days.

(21) Appl. No.: 09/920,200

(22) Filed: Aug. 1, 2001

(65) Prior Publication Data

US 2003/0026883 A1 Feb. 6, 2003

(51) Int. Cl.[7] .................................................. A23F 5/00
(52) U.S. Cl. ...................................... 426/595; 426/594
(58) Field of Search ............................... 426/432, 433, 426/594, 388, 595, 430

(56) References Cited

U.S. PATENT DOCUMENTS

| | | |
|---|---|---|
| 1,454,739 A | 5/1923 | Holland et al. |
| 1,930,257 A | 10/1933 | Stelkins |
| 2,469,553 A | 5/1949 | Hall |
| 2,515,730 A | 7/1950 | Ornfelt et al. |
| 2,531,594 A | 11/1950 | Abrams et al. |
| 2,562,206 A | 7/1951 | Nutting et al. |
| 2,750,998 A | 6/1956 | Moore |
| 2,771,343 A | 11/1956 | Chase et al. |
| 3,183,096 A | 5/1965 | Hiscock et al. |
| 3,436,227 A | 4/1969 | Bergeron et al. |
| 3,493,388 A | 2/1970 | Hair |
| 3,620,756 A | 11/1971 | Strobel et al. |
| 3,625,703 A | 12/1971 | Ericson |
| 3,637,397 A | 1/1972 | Menzies et al. |
| 3,640,727 A * | 2/1972 | Heusinkveld ................. 426/77 |
| 3,644,122 A | 2/1972 | Yeransian |
| 3,652,293 A | 3/1972 | Lombana et al. |
| 3,671,262 A | 6/1972 | Wolfson et al. |
| 3,671,263 A | 6/1972 | Patel et al. |
| 3,682,649 A | 8/1972 | Orozovich |
| 3,705,810 A | 12/1972 | Lendvay |
| 4,048,345 A | 9/1977 | Katz |
| 4,278,696 A | 7/1981 | Magnolato |
| 4,280,830 A | 7/1981 | Ferguson et al. |
| 4,349,573 A | 9/1982 | Stefanucci et al. |
| 4,474,821 A | 10/1984 | Morrison et al. |
| 4,619,830 A * | 10/1986 | Napier ........................ 426/82 |
| 4,637,935 A | 1/1987 | Kirkpatrick et al. |
| 4,793,990 A | 12/1988 | Grollier et al. |
| 5,328,708 A | 7/1994 | Rizzi et al. |

FOREIGN PATENT DOCUMENTS

| | | | |
|---|---|---|---|
| CA | 1032825 | * | 6/1978 |
| DE | 851453 | | 10/1952 |
| DE | 268150 | | 5/1989 |
| DE | 268151 | | 5/1989 |
| EP | 0 078 618 A2 | | 5/1983 |
| EP | 0 078 650 A1 | | 5/1983 |
| EP | 0363529 | * | 3/1993 |
| FR | 689951 | | 9/1930 |
| GB | 1 564 094 | | 4/1980 |
| JP | 5917903 | | 10/1984 |
| JP | 60014829 | | 1/1985 |
| JP | 0228379 | | 11/1990 |

OTHER PUBLICATIONS

"Official Methods of Analysis" The Association of Official Analytical Chemists; 1990, 15th Edition; Method No. 920 39; Method No. 931.04.

"Coffee Processing Technology" Sivetz & Foote; Avi Publishing Co. 1963, vol. 1; pp. 203–226; pp. 382–513.

"Coffee Processing Technology" Sivetz & Foote; Avi Publishing Co. 1963, vol. 2; pp. 27–30; pp. 239–250; pp. 261–378.

"Coffee Technology" R.J. Clarke & R. Macrae; Elsevier Applied Science Publishers, 1987; vol. 2, Chapter 5.

* cited by examiner

*Primary Examiner*—Anthony Weier
(74) *Attorney, Agent, or Firm*—Carl J. Roof

(57) ABSTRACT

Shown is a composition for preparing fresh brewed coffee beverages wherein the composition includes processed coffee grounds (PCGs) that are described in the specification. In particular, the composition includes processed coffee grounds and roasted and ground coffee. A process for making the composition is also shown; the process includes combining roasted and ground coffee and PCGs, preferably in a ratio of from about 200:1 to about 10:1.

Also shown is a process for making brewed coffee or a coffee extract, the process includes (i) contacting PCGs and roasted and ground coffee with water to generate a brewed coffee or a coffee extract; and (ii) collecting the brewed coffee for subsequent consumption or collecting the coffee extract for additional processing.

Also shown is a process for making instant (soluble) coffee includes contacting a coffee extract with the PCGs described herein.

12 Claims, No Drawings

COFFEE COMPOSITIONS COMPRISING PROCESSED COFFEE GROUNDS

TECHNICAL FIELD

The present invention relates to improved coffee compositions for preparing instant coffee, liquid coffee concentrates, or fresh-brewed coffee. The compositions of the invention comprise processed coffee grounds.

BACKGROUND OF THE INVENTION

The art includes numerous methods directed toward enhancing the flavor of instant coffee, brewed coffee and coffee extracts. With respect to brewed coffee and coffee extracts, these methods typically attempt to achieve this goal without sacrificing the desirable yields and conveniences associated with conventional high temperature (generally at least about 65° C. (149° F.)) coffee extraction. It is generally recognized that high temperature coffee extraction is convenient and economical to the end user, but that flavor is often compromised. That is, end users (both at home consumers and those in an industrial setting) prefer the convenience of conventional brewing appliances, which use high temperature extraction. It follows, then, that to be of appeal to consumers or to industry, methods of enhancing flavor must do so without sacrificing convenience. Additionally, the methods must provide these attributes while being economical to the end user.

Selective extraction is one general approach to improving the flavor of brewed coffee or coffee extract. According to this approach, a preferred ratio of bad to good coffee flavors are extracted from roasted and ground coffee. Ideally, this selective extraction improves the overall flavor of brewed coffees or coffee extracts without compromising its flavor strength or extraction yield. Two well known selective extraction methods are low temperature extraction and selective extraction via adsorbents. Although both methods are known to improve coffee flavor, it is also recognized that each method has serious deficiencies. For example, low temperature extraction generally provides lower yields than high temperature extraction.

Unlike low temperature extraction, adsorbents accommodate high temperature conditions and also preferably adsorb a favorable ratio of bad flavor components to good flavor components without sacrificing yield and convenience. Adsorbents used in roasted and ground coffee include activated carbons (i.e., activated charcoals), carbohydrates and carbohydrate polymers (e.g., alginic acid), synthetic polyamides, insoluble polyvinylpolypyrrolidone, certain mineral substances (e.g. aluminum oxides, silica gel), amidated cellulose materials (e.g., chitosan, chitan), and proteinaceous materials (e.g. gelatin, zein).

These prior art adsorbents have been used in various ways to improve the flavor of brewed coffee or coffee extracts. Some have been added to extraction columns in industry, to the extract from extraction columns, to packaged roasted and ground coffee marketed for consumer use, or to the structure of coffee filters used in conventional brewing devices. These adsorbents improve the flavor of brewed coffee or coffee extract by either adsorbing (and therefore removing) a favorable ratio of bad flavor components to good flavor components, or by adsorbing good flavor components during storage and releasing them upon extraction. In spite of the flavor improvements, adsorbents described in the prior art are typically expensive and may pass into the final coffee beverage, thereby providing negative mouth feel character.

In U.S. Pat. No. 5,328,708, Rizzi et al. describe a process for removing lipids from spent coffee grounds so they comprise less than 2% lipids, whereupon they are suitable for use as an adsorbent for bitter coffee flavors and burnt coffee aromas. The removal of lipids is accomplished via organic solvent extraction using lipophilic solvents, such as ethanol, methanol, chloroform, hexane and ethyl acetate. Although this method is known to improve coffee flavor, it is also recognized that the method has deficiencies. For example, it is well recognized in the industry that the use of organic solvent systems is not only very capital intensive, but can be problematic when dealing with solvent reclamation, safety, and environmental issues. These problems can be further compounded when dealing with multiple solvent systems. Not only are special precautions necessary when using these solvents, it is also recognized that volatile organic compound (VOC) emissions from such solvents are tightly regulated by the U.S. government.

Applicants have discovered that, surprisingly, spent coffee grounds can be rendered useful as adsorbents for improving flavor of brewed coffee or coffee extracts without the removal of lipids. The use of organic solvents is therefore unnecessary for providing the processed coffee grounds of the present invention. Because lipids are not removed from the starting spent coffee grounds to arrive at the improved processed coffee grounds, the processed grounds comprise greater than 2% lipids. The improved processed coffee grounds may allow lower usage levels in coffee compositions while achieving desirable removal of off coffee flavors.

While prior art methods have utilized adsorbents to enhance the flavor of coffee, there is a continuing need for improved adsorbents to further enhance brewed coffee flavor. Applicants' use of spent grounds processed in accordance with the description below provides coffee flavor benefits, while also utilizing a material that is otherwise of limited, if any, value.

SUMMARY OF THE INVENTION

This invention is directed to a composition for preparing fresh brewed coffee beverages wherein the composition comprises processed coffee grounds (PCGs) that are described herein. In particular, the composition comprises processed coffee grounds and roasted and ground coffee.

The invention is further directed to a process for making a composition of the present invention, the process comprising combining roasted and ground coffee and PCGs in a ratio of from about 200:1 to about 10:1.

The invention is still further directed to a process for making brewed coffee, the process comprising (i) contacting a composition of the present invention with water to generate a brewed coffee; and (ii) collecting the brewed coffee for subsequent consumption.

The invention is still further directed to a process for making a coffee concentrate, the process comprising (i) contacting a composition of the present invention with water to generate a coffee concentrate; and (ii) collecting the concentrate for eventual packaging for sale to a consumer.

The invention is still further directed to a process for making soluble coffee, comprising contacting a coffee extract with processed coffee grounds described herein.

DETAILED DESCRIPTION OF THE INVENTION

I. Definitions:

The term "brewed coffee" means a coffee beverage obtained by aqueous extraction of roasted and ground coffee using conventional brewing devices (e.g., percolators, electric percolators, drip coffee makers, automatic drip coffee makers). Use herein of the term "brewed coffee beverage" refers to a liquid beverage that is intended for consumption without further processing, other than manipulation by the end consumer (e.g., addition of flavors, creams, sweeteners, or the like).

The term "coffee concentrate" means a liquid coffee extract, or a dried product of the extract, obtained by aqueous extraction of roasted and ground coffee, wherein such extract is further processed (e.g., diluted) prior to consumption.

The term "coffee extract" means a liquid extract of roasted and ground coffee, or a dried product of the extract, obtained during the manufacture of soluble (i.e., instant) coffee. As used herein, the term "coffee extract" refers to an "intermediate" liquid or solid that is subsequently processed and eventually dried to provide soluble (instant) coffee particles.

The term "comprising" means that the various components, ingredients, or steps can be conjointly employed in practicing the present invention. Accordingly, the term "comprising" encompasses the more restrictive terms "consisting essentially of" and "consisting of".

The term "high temperature extraction" means aqueous extraction of roasted and ground coffee, the water temperature exceeding about 65° C. (149° F.).

The term "instant coffee beverage" means a coffee beverage obtained by dissolving soluble (i.e., instant) coffee particles in a liquid medium, typically heated water. The terms "instant" and "soluble" are used interchangeably herein.

The term "low temperature extraction" means aqueous extraction of roasted and ground coffee, the water temperature being not more than about 65° C. (149° F.).

The term or symbols for "percent" refers to weight-weight percent, unless otherwise indicated.

The term "processed coffee grounds" or "PCGs" means the residue of coffee grounds remaining after an aqueous extraction of roasted and ground coffee. Because lipids are not removed from the starting spent coffee grounds to obtain the PCGs used herein, the PCGs will comprise greater than 2% lipids. Typically the PCGs will comprise at least about 5% lipids, more typically at least about 10% lipids and still more typically at least about 15% lipids.

Reference herein to ratios is on a weight-weight basis, unless otherwise specified.

II. PCGs, Compositions and Processes

According to the present invention, it has now been found that the processed coffee grounds described herein function as an inexpensive adsorbent that selectively reduces burnt coffee flavors, bitter coffee flavors, or modulates the flavor characteristic of coffee (e.g., reduces acidity) without contaminating the coffee beverage or sacrificing coffee yield. When PCGs are added to roasted and ground coffee particles, the resulting composition can be extracted by conventional water (typically hot water) methods to produce an improved brewed coffee, coffee concentrate or coffee extract. The following describes in more detail the PCGs useful herein, compositions containing PCGs and processes for making the compositions, and processes for brewing coffee and making soluble coffee using the PCGs.

A. PCGs

As mentioned, Applicants have discovered that the functional adsorbent quality of spent coffee grounds is directly proportional to the extent to which they have been extracted with water, up to a point where they have reached their maximum potential. Spent coffee grounds taken directly from a coffee brewer and dried may not exhibit an adsorbent quality in a coffee composition to be sensorially perceptible. For these grounds to demonstrate functional absorbency (and to therefore function as PCGs per the present invention), they may need to be further processed with additional water extractions. This is because the extraction conditions don't allow for sufficient removal of the otherwise extractable components. In contrast, coffee grounds resulting from the manufacture of soluble coffee will typically require no additional extraction to function as PCGs, although some degree of additional processing (e.g., drying, as discussed below) may be necessary to optimize their functionality.

It is well recognized to those skilled in the art that the extent the roasted and ground particles are extracted is contingent upon the method of extraction (e.g., batch or multiple batch versus continuous, static or mixed bed, co-current versus counter-current), specific equipment selection, extraction efficiencies, time, temperatures utilized, and the like. It would be easily recognized by those skilled in the art that the degree of extraction chosen will be based on the desired adsorbency effect and economics, realizing that at some point further extraction will eventually bring diminishing returns. It has been further discovered that these water extractions will induce the adsorbent functionality of the grounds in the presence of any lipids naturally present within or on the surface of the grounds. Further, it has been found that coffee grounds that have been first decaffeinated using known processes to those skilled in the art, prior to water extraction(s), will also exhibit adsorbent functionality. Surprisingly, it has been found that although there is a high lipid level within the spent coffee grounds, off flavors normally associated with lipid oxidation by-products, do not occur when the PCGs are dried under mild conditions and are then fresh packaged.

Because the starting spent coffee grounds are not subjected to extraction by lipophilic solvents as described in the Rizzi patent, the PCGs will comprise greater than 2%, by total weight, lipids, and typically significantly higher lipid levels. The PCGs will typically comprise at least about 5% lipids, more typically at least about 10% lipids and still more typically at least about 15% lipids. Typically, the PCGs will comprise from about 5% to about 20% lipids. The lipid content of the PCGs is measured using Method Number 920.39 as described in "Official Methods of Analysis" of The Association of Official Analytical Chemists. This method is described in detail in the Test Methods section below.

The average particle size of the PCG particles will preferably range from about 20 mesh U.S. Standard Sieve Series to about 200 mesh U.S. Standard Sieve Series, although particle sizes outside this range would also be acceptable. Within this range, particle size has little impact on the efficacy of the PCGs.

When derived from a soluble coffee manufacturing process, the dried PCGs may be larger granules than a 20 mesh U.S. Standard Sieve. These larger granules can be further comminuted to granules consistent with typical roasted and ground products without affecting the adsorbent functionality of the PCGs. Various types of grinders known in the industry can be used for this purpose. As PCG particle size varies within the above range, surface area also varies but efficacy as an adsorbent for bad coffee flavors appears to remain substantially unchanged.

PCGs are extracted (and typically dried) coffee grounds that are known to contain approximately 10–15% protein. While not wishing to be bound by any theory, since some prior art adsorbents used in coffee brewing contain a large protein component, it is believed that the processing of the PCGs removes components already adsorbed to these proteins within the grounds. Once removed, and placed in contact with an aqueous extraction medium, these proteins are available to re-adsorb negative flavored components, thus reducing/removing them from the resulting brewed coffee, coffee concentrate or coffee extract.

PCGs can be derived from low, intermediate or high quality coffee beans, or blends thereof. In order to maximize the economic benefit of using "spent" grounds, preferred are low quality coffees or blends containing low quality coffee. Non-limiting examples of low quality beans include robustas, low grade naturals such as Haiti XXX, Peru Natural, Salvadors, low grade Brazils, and low grade unwashed Arabicas such as the Ugandas, Indonesians, Ivory Coast, Dominican Republic, Equador, Resacas and Guatemalan TMS.

PCGs can be derived from any coffee source, but for economic reasons are preferably derived as a by-product of soluble coffee manufacturing. PCGs contain less than about 1% soluble coffee solids. PCGs therefore make a plentiful, inexpensive material for inclusion in coffee compositions. Soluble coffees are usually produced by counter current extraction mechanisms well known to those skilled in the art. Typically, an aqueous extraction medium at temperatures from about 65° C. (149° F.) to about 175° C. (330° F.) passes through a series of extraction columns filled with roasted and ground coffee with fresh aqueous extraction medium starting at the column with the most extracted roasted and ground coffee, moving sequentially through the series of columns, and eventually through the last column of fresh roasted and ground coffee. The extract is then collected, a new column of fresh roasted and ground coffee is added to the end of the column sequence, and the first column is discarded as spent coffee grounds. The spent coffee grounds are released from the extraction column by opening the hot, pressurized column and blowing the pressurized grounds into a holding vessel. These grounds can subsequently be processed to provide PCGs as described herein. Many variations of the counter current method have been described, as well as non-counter current methods of manufacturing soluble coffee, all of which provide an acceptable source of PCGs for the present invention.

PCGs contain a large lipid component that can be oxidized, increasing the likelihood of developing an adsorbent aftertaste on the eventual product of the invention. Accordingly, although PCGs may be functional in a wet state, it is desirable to avoid the oxidation of any lipids during further processing of the coffee grounds. It is also important that the PCGs be microbially stable. Accordingly, it may be preferable to dry the PCGs prior to further processing. For example, mild drying conditions can be employed in drying the PCGs to achieve this goal. In one preferred embodiment, for example where the PCGs are combined with roasted and ground coffee, the PCGs will have a moisture content of less than about 10%. The method for measuring moisture content is described in the Test Method section below.

PCGs being porous granules can be dried in a variety of ways, including but not limited to convective drying, forced air drying, fluidized bed drying, vacuum drying, infrared drying, or microwave drying. Indeed, any conventional drying process that does not subject the PCGs to temperatures or for extended lengths of time that would degrade the PCG structure or the components making up the PCG structure or promote oxidation, or other chemical degradation, can be used. Fluidized bed drying is preferred due to its milder temperatures and speed of drying so as to minimize lipid oxidation, as well as its reduced complexity and economics.

The newly manufactured and dried PCGs appear as a customary granular coffee, which is substantially odorless and tasteless. As mentioned, PCGs are derived from any source, but preferably are derived as a by-product of soluble coffee manufacturing.

B. Compositions and Processes

PCGs are added to roasted and ground coffee to form the composition of the current invention. The PCGs and roasted and ground coffee can be combined by conventional dry mixing methods. As a matter of convenience in manufacture, the PCGs can be added to whole bean roasted coffee prior to grinding and ground simultaneously. This is particularly useful when the PCGs are of larger particle size than is customary for retail roasted and ground products. (For example, when the PCGs are derived from a soluble coffee manufacturing process.) The simultaneous grinding has the further advantage of providing intermixing resulting in a more homogeneous coffee blend.

The weight ratio of roasted and ground coffee to PCGs will typically be from about 10:1 to about 200:1, more typically from about 30:1 to about 170:1, still more typically from about 65:1 to about 133:1. A composition with a ratio greater than 200:1 typically will provide an insignificant benefit from the PCGs, and a composition with a ratio less than 10:1 typically will produce a weak coffee with some adsorbent aftertaste. Of course, these general parameters will be dictated by the relative adsorbent capacity of the PCGs utilized, which is impacted by various factors as discussed above. Accordingly, the ranges provided herein are not meant to limit the scope of the appended claims.

In one embodiment, the composition of the present invention will comprise roasted and ground coffee, PCGs and soluble coffee. In one such embodiment, this composition is useful in a product similar to the Folger's Singles® product (marketed by the Procter & Gamble Company), which provides an "instant", one cup coffee preparation. The beverage is generated by steeping a water permeable packet containing the PCGs, the roast and ground coffee and the instant coffee particles. Examples of coffee-containing packets are well known in the literature. See, e.g., U.S. Pat. No. 1,454,739 to C. B. Holland et al., U.S. Pat. No. 2,531,594 to L. H. Abrams et al., U.S. Pat. No. 3,183,096 to E. F. Hiscock et al., and U.S. Pat. No. 3,640,727 to M. R. Heusinkveld, the disclosure of each of which is incorporated herein by reference.

In those embodiments where instant coffee is included with the PCGs and the roasted and ground coffee, the instant coffee particles can be prepared by any convenient process. A variety of such processes are known to those skilled in the art. Conventionally, instant coffee is prepared by roasting and grinding a blend of coffee beans, extracting the roasted and ground coffee with water to form an aqueous coffee extract, and drying the extract to form "instant coffee." Typical roasting equipment and methods for roasting coffee beans are described, for example, in Sivetz & Foote, COFFEE PROCESSING TECHNOLOGY, Avi Publishing Co., Westport, Conn., 1963, Vol. 1, pp. 203–226. Typical oil expelling equipment is described, for example, in Sivetz, COFFEE PROCESSING TECHNOLOGY, Avi Publishing Co., Westport, Conn., 1963, Vol. 2, pp. 27–30; typical grinding equipment is described, for example, in Sivetz & Foote, supra, pp. 239–250. Typical disclosures of equipment and methods which can be used for extracting coffee include: U.S. Pat. No. 2,562,206 to Nutting et al., Sivetz & Foote, supra, pp. 261–378; and U.S. Pat. No. 2,515,730 to Omfelt et al. Typical disclosures of spray drying processes which can be used to prepare instant coffee particles can be found, for example, in Sivetz & Foote, COFFEE PROCESSING TECHNOLOGY, Avi Publishing Co., Westport, Conn., 1963, Vol. 1, pp. 382–513; U.S. Pat. No. 2,771,343 to Chase et al., U.S. Pat. No. 2,750,998 to Moore, and U.S. Pat. No. 2,469,553 to Hall. The instant coffee component can be any one of the commercially available instant coffees sold on the market, or combinations thereof. These include spray dried instant coffee powders, agglomerates and freeze-dried chunks.

Examples of instant coffees useful herein include, but are not limited to, those disclosed in U.S. Pat. No. 3,436,227 to Bergeron et al., U.S. Pat. No. 3,493,388 to Hair, U.S. Pat. No. 3,615,669 to Hair et al., U.S. Pat. No. 3,620,756 to Strobel et al., U.S. Pat. No. 3,637,397 to Menzies et al., and U.S. Pat. No. 3,652,293 to Lombana et al. The instant coffee used may be any single variety of coffee or a blend of different varieties. The instant coffee component may be regular or decaffeinated. The instant coffee may optionally be processed to reflect a unique flavor characteristic such as expresso, French roast, or the like.

The roasted and ground coffee can be derived from low, intermediate or high quality coffee beans, or blends thereof. The roasted and ground coffee can be either decaffeinated or non-decaffeinated. PCGs can be added to straight or blended coffees of various degrees of roast. PCG usage level is determined by the effect desired. For example, for a blend of coffees where one component is roasted darker for a requisite flavor but incurs an increase in bitterness, PCGs can be added at higher levels to offset or minimize the increased bitterness. Low quality roasted and ground coffee beans have an undesirable or excessive bitter flavor that can be reduced by PCGs. Some lower quality coffee beans may also have a rather strong characteristic flavor that can become a flavor negative when used at too high of levels within a blend of coffees, i.e., the characteristic flavor becomes too dominant. PCGs can be added at a level to achieve the desired effect of modulating this characteristic flavor. Non-limiting examples of low quality beans include robustas, low grade naturals such as Haiti XXX, Peru Natural, Salvadors, low grade Brazils, and low grade unwashed Arabicas, such as the Ugandas, Indonesians, Ivory Coast, Dominican Republic, Equador, Resacas and Guatemalan TMS. Processes for making decaffeinated and non-decaffeinated roasted and ground coffee are well known in the art. See, e.g., U.S. Pat. No. 4,637,935 to Kirkpatrick et al., U.S. Pat. No. 4,349,573 to Stefanucci et al., U.S. Pat. No. 4,474,821 to Morrison et al., U.S. Pat. No. 3,671,262 to Wolfson et al. and U.S. Pat. No. 3,671,263 to Patel et al., the disclosure of each of which is incorporated by reference.

Likewise, the composition of the invention can also be used by consumers to make a brewed coffee having a modulated flavor with reduced negative flavors, and/or reduced burnt flavors, and/or reduced bitter flavors. The coffee composition can be packaged the same as a conventional roasted and ground coffee for the consumer market. The composition does not leave an unpleasant adsorbent aftertaste in the brewed coffee and, most importantly, consumers can obtain the flavor benefit of the invention by conventional brewing methods—hot water extraction using conventional consumer brewing devices (e.g., percolators, electric percolators, drip coffee makers, automatic drip coffee makers).

In another aspect, the present invention is directed to a process for making a composition of the present invention, the process comprising combining roasted and ground coffee and PCGs in a ratio of from about 200:1 to about 10:1. As discussed above, the PCGs can be combined with the roasted and ground coffee particles either after the roasted particles are ground, or during the grinding process itself. The PCGs can be combined with the roasted and ground particles to form a relatively homogeneous blend. Such a homogeneous blend is preferred when the product is to be sold as a bulk brewed coffee product (e.g., sold in traditional cans). Alternatively, the PCGs and roasted and ground coffee can be combined in a heterogeneous manner (e.g., two distinct layers). Such a heterogeneous blend would be useful where the coffee components are to be sold in a packet for brewing in a drip coffee maker.

The invention is still further directed to a process for making a coffee concentrate, the process comprising (i) contacting a composition of the present invention (i.e., containing PCGs) with water to generate a coffee concentrate; and (ii) collecting the concentrate for eventual packaging for distribution to a consumer. In the water extraction step, the water is preferably heated to a temperature of at least about 65° C. (149° F.). According to this process, the resulting coffee concentrate is in either liquid or solid form. The concentrate is then packaged for eventual distribution, where some additional processing (e.g., dilution) is required to provide a consumable beverage.

The invention is still further directed to a process for making soluble coffee comprising contacting a coffee extract with PCGs described herein. In one embodiment for making soluble coffee, the PCGs and roast and ground coffee are added to counter current extraction columns so as to produce a coffee extract with a modulated flavor having reduced negative flavors, and/or reduced burnt flavors, and/or reduced bitter flavors. In an alternative embodiment, a coffee extract (e.g., derived from roast and ground hot temperature extraction) containing from about 5% to about 25% soluble coffee solids is first devolatilized by stripping away the flavor compounds. Then it is concentrated, preferably to from about 30% to about 50% soluble coffee solids, using methods commonly known to those skilled in the art. This concentrated extract is then contacted with PCGs prior to adding back flavor compounds and spray drying. Alternatively, a soluble coffee extract (e.g., derived from roasted and ground hot temperature extraction) is contacted with PCGs after first removing the volatile components. Then the devolatilized PCG-treated coffee extract is subject to a concentration process, the volatile compounds are added back and then dried. Yet another alternative is to devolatilize the initial coffee extract, then concentrate it to from about 30% to about 50% coffee solids, then add back the volatiles and then contact the complete mixture with PCGs before spray drying.

The invention is still further directed to a process for making a brewed coffee beverage, the process comprising (i) contacting a roasted and ground coffee and PCGs with water to generate a brewed coffee; and (ii) collecting the brewed coffee for subsequent consumption. This process is most typically carried out using conventional drip coffee makers. In this process, a preferred embodiment is where the composition is subjected to high temperature extraction in step (i). In one embodiment, the roasted and ground coffee and the PCGs are combined in a single composition prior to being contacted with water. Alternatively, the roasted and ground coffee and the PCGs may be separate when contacted by the water. (For example, the two may be in separate compartments of a single package.)

III. Test Methods—Moisture Content; Water Activity; and Lipid Content

The moisture content of the PCGs is determined by a gravimetric method similar to Method Number 931.04 as described in the Official Methods of Analysis of the Association of Official Analytical Chemists, $15^{th}$ Edition, 1990. A 10 g sample of the wet processed grounds is accurately weighed in an aluminum pan and dried to constant weight at 100° C. in an oven with air circulation.

The water activity (ratio of vapor pressure of water in product to vapor pressure of pure water at the same temperature) of the PCGs is determined by a method similar to Method Number 978.18, ibid. Here a Rotronic hygroscop® water activity meter made by Rotronic AG, Grindelstrasse 6, CH-8303 Bassersdorf, Switzerland, equipped with a WA40-TH constant temperature measuring cell, is used.

Crude lipid content of the PCGs is determined by exhaustive extraction of the lipids based on Method Number 920.39 as described in the Official Methods of Analysis of the Association of Official Analytical Chemists, $15^{th}$ Edition, 1990. Any one of the solvents—petroleum ether, hexane, chloroform, diethylether and methanol, or a combination thereof—can be used as the extraction solvent.

IV. EXAMPLES

Example 1

Roasted and ground coffee is further processed to provide functional benefits in a coffee matrix by the following batch preparation. 40 g of Folgers® French-Roast roasted and ground coffee is added to a Bunn™ model OL-35 commercial coffee machine's filter basket containing a paper coffee filter. The brew button is depressed and the coffee is automatically extracted in the typical manner. Upon completion, the soluble portion is discarded and the insoluble coffee grounds are obtained and transferred to a 4 L beaker. For the first extraction, these coffee grounds are further processed by addition of 1700 mL of distilled and deionized water. The contents are stirred using a large spatula to suspend the grounds, and then allowed to stand for several minutes to allow the coffee grounds to settle. Approximately ⅓ of the bulk liquid is then decanted off to remove the fines that have remained in suspension. The remaining grounds are once again resuspended in the remaining liquid by stirring with a spatula, and are immediately poured into a coffee basket that is supported by a stand and that contains a fresh coffee filter. The filtrate is allowed to drain and is discarded. The coffee grounds are again transferred to a clean 4-liter beaker. For the second extraction, 1700 mL of water is added and the procedure is repeated for a total of six extractions. After the sixth extraction, these further processed grounds are transferred from the filter paper and spread out in a 10-inch aluminum pie pan, for drying. The pan is placed in a Blue M™ Stabil-Therm fan-forced laboratory convection oven Model ESP-401C, held at 60° C. for 18 hours, then allowed to cool to room temperature. These further processed coffee grounds remain physically, microbially, and chemically stable when packaged in accordance with customary roasted and ground coffee products. The water activity of these processed coffee grounds is less than $0.85a_w$ @25° C. and the moisture content is less than 9.72%.

Example 2

A 2.5 g (5%) sample of the processed coffee grounds from Example 1 is put into a quart-size glass jar followed by 50 g of Folgers® French-Roast roasted and ground coffee. The jar is capped and shaken to mix the contents. The admixed coffee is placed into a Bunn™ model OL-35 commercial coffee machine's filter basket containing a paper coffee filter. The brew button is depressed and the coffee is automatically brewed in the typical manner. The resulting brewed coffee is less bitter, and has less off-flavor than a control coffee made in the same manner but omitting the dried processed coffee grounds.

Example 3

A small slit is cut into Folgers® Singles coffee bag (sold by The Procter & Gamble Company) using an X-acto knife and 0.25 g (nominally 5%) of the processed coffee grounds from Example 1 is introduced into the coffee bag, containing nominally 4.42 g of a blend of ground and concentrated coffees. The bag is re-sealed using a Sealboy™ thermal package sealer type 235 SA from Packaging Aids Corporation with a sealing time set to 10. The bag is added to an eight ounce Styrofoam™ cup, boiling water is added and the contents are allowed to brew for 60 seconds. The bag is then dunked up and down for 30 seconds whereupon the bag is withdrawn from the beverage and discarded. The resulting beverage is less bitter and has a reduced coffee concentrate flavor as compared to a Folgers® Singles control made in a similar manner but without the processed coffee grounds.

Example 4

Roasted and ground coffee can be further processed on a commercial scale to provide the functional benefits in a coffee matrix, using known commercial processes. Roasted and ground coffee is added to a battery of commercial percolation extractors known and used in the industry for preparation of soluble coffee extract, as described in Coffee Technology, Vol. 2, Chapter 5, Edited by R. J. Clarke and R.Macrae© (Elsevier Applied Science Publishers LTD (1987). The number of extraction columns in such batteries typically ranges from five to eight. These grounds can be made functional by processing as described, following the industrial practice of using higher feed water temperatures, up to 180° C. in a countercurrent fashion with the roasted coffee, i.e., the most exhausted coffee being contacted first. Typically the temperature of the liquor and grounds is then reduced to around 100° C. by the time the freshest grounds are contacted. The soluble extract from such processing can be subsequently dried as instant coffee. The remaining processed coffee grounds are removed from their respective columns and conveyed to a screw-press, known and used in the industry to effectively remove bulk water. The mechanical forces imposed on the coffee grounds by the screw-press reduces the moisture content from about 98% to about a 56%. The damp grounds are conveyed to a fluidized bed drier, and dried to a final moisture level of less than 9.72% with a water activity of less than $0.85a_w$ @25° C. Drying conditions for a 6-inch static bed height of coffee grounds and an 18 to 20 minute residence time can be accomplished with an air inlet temperature of 86.10° C. and an air flux of 1.25 $kg/m^2/s$. These dried grounds are physically, microbially, and chemically stable and can be transferred to appropriate storage facilities such as a silo, or they can be immediately packaged. Coffee grounds processed in this manner provide the intended functional benefit, when added to and packaged with customary roasted and ground coffee products, or when used on a commercial scale in the manufacture of instant-coffee or liquid coffee concentrates.

Example 5

A coffee blend is prepared by mixing 10 g (30%) roasted and ground Arabican variety coffee beans with 23.3 g (70%)

roasted and ground Robusta variety coffee beans. To this mixture (33.3 g) is added an additional 0.17 g (0.5%) of the processed coffee grounds from Example 4, and the mixture is blended well. The coffee mix is added to a Mr. Coffee™ model PRX23 0898 retail coffee brewer's basket containing a paper coffee filter and is brewed with 1420 mL of distilled and deionized water and a coffee beverage (designated as Coffee Beverage A) is obtained. Another coffee beverage (designated as Coffee Beverage B) is prepared from a 33.3 g of coffee blend comprising 50% roasted and ground Arabican variety coffee beans with 50% roasted and ground Robusta variety coffee beans. Coffee Beverage A, brewed with the dried processed coffee grounds, has a less bitter aftertaste, is a little more balanced, with slightly less strength as compared to Coffee Beverage B.

Example 6

An instant coffee or coffee concentrate is prepared on a commercial scale using known commercial processes, by the addition of PCGs in the coffee matrix. A blend comprising roasted and ground coffee and 1.5% PCGs from Example 4 are added to a battery of commercial percolation extractors known and used in the industry for preparation of soluble coffee extract, as described in Coffee Technology, Vol 2, Chapter 5, Edited by R. J. Clarke and R.Macrae©, Elsevier Applied Science Publishers LTD (1987). The number of extraction columns in such batteries typically range from five to eight. Following industrial practices, the columns are operated in a counter-current mode, i.e., the most exhausted coffee in the extraction battery is contacted first with higher feed water temperatures, up to 180° C. Typically the temperature of the liquor and grounds is then reduced to around 100° C. by the time the freshest grounds are contacted. The liquid coffee extract concentrate, resulting from such processing and the starting coffee blend, will have a modulated flavor with reduced negative flavors, and/or reduced burnt flavors, and/or reduced bitter flavors. This liquid extract can be further concentrated if desired using known processes to remove bulk water, to produce a liquid coffee concentrate for commerce. Alternatively, the liquid coffee concentrate can be subsequently dried as an improved instant coffee having a modulated flavor with reduced negative flavors, and/or reduced burnt flavors, and/or reduced bitter flavors.

What is claimed is:

1. A composition for preparing a brewed coffee beverage, the composition comprising (1) roasted and ground coffee and (2) processed coffee grounds (PCGs) comprising greater than 2%, by weight, lipids.

2. A composition of claim 1, wherein the PCGs comprise at least about 10% lipids.

3. A composition of claim 2, wherein the PCGs comprise at least about 15% lipids.

4. A composition of claim 1, wherein the PCGs comprise from about 5% to about 20% lipids.

5. A composition of claim 1, wherein the average particle size of the PCGs is from about 20 mesh to about 200 mesh U.S. Standard Sieve Series.

6. A composition of claim 1, wherein the roasted and ground coffee and the PCGs are combined in weight ratio of from about 10:1 to about 200:1.

7. A composition of claim 6, wherein the roasted and ground coffee and the PCGs are combined in weight ratio of from about 65:1 to about 133:1.

8. A composition of claim 1, wherein the roasted and ground coffee is derived from the group consisting of robusta beans, Arabica beans and mixtures thereof.

9. A composition of claim 1, wherein the PCGs are derived from roasted and ground coffee that has been used in the manufacture of soluble coffee and the PCGs have a moisture content of about 10% or less.

10. A composition for preparing an instant coffee beverage, the composition comprising (1) roasted and ground coffee, (2) processed coffee grounds (PCGs) comprising greater than 2%, by weight, lipids, and soluble coffee particles.

11. An article of manufacture comprising the composition of claim 10, wherein the composition is contained in a water permeable pouch.

12. A composition of claim 1, wherein the PCGs comprise at least about 5% by weight, lipids.

* * * * *